(12) United States Patent
Hodge et al.

(10) Patent No.: US 11,203,306 B2
(45) Date of Patent: Dec. 21, 2021

(54) DASHBOARD ATTACHMENT DEVICE

(71) Applicant: Xirgo Technologies, LLC, Camarillo, CA (US)

(72) Inventors: Andrew Hodge, Palo Alto, CA (US); Lynette Ross, Palo Alto, CA (US); Stephen Senatore, San Francisco, CA (US); Adam Rodriguez, Hacienda Heights, CA (US)

(73) Assignee: XIRGO TECHNOLOGIES, LLC, Camarillo, CA (US)

( * ) Notice: Subject to any disclaimer, the term of this patent is extended or adjusted under 35 U.S.C. 154(b) by 0 days.

(21) Appl. No.: 16/958,122

(22) PCT Filed: Jan. 2, 2019

(86) PCT No.: PCT/US2019/012101
§ 371 (c)(1),
(2) Date: Jun. 25, 2020

(87) PCT Pub. No.: WO2019/136101
PCT Pub. Date: Jul. 11, 2019

(65) Prior Publication Data
US 2020/0339042 A1 Oct. 29, 2020

Related U.S. Application Data

(60) Provisional application No. 62/614,159, filed on Jan. 5, 2018.

(51) Int. Cl.
*B60R 11/04* (2006.01)
*B60R 11/00* (2006.01)

(52) U.S. Cl.
CPC ....... *B60R 11/04* (2013.01); *B60R 2011/0005* (2013.01); *B60R 2011/0026* (2013.01); *B60R 2011/0056* (2013.01)

(58) Field of Classification Search
CPC ............. B60R 11/04; B60R 2011/0005; B60R 2011/0026; B60R 2011/0056; B60R 11/00
(Continued)

(56) References Cited

U.S. PATENT DOCUMENTS 5,396,556 A * 3/1995 Chen ................... B60R 11/0241
379/426
D391,712 S * 3/1998 Immerman .................... D32/41
(Continued)

FOREIGN PATENT DOCUMENTS

CN 204124071 U 1/2015
DE 3634722 A1 5/1988
(Continued)

OTHER PUBLICATIONS

European Application No. EP19735963.1, Extended European Search Report dated Sep. 18, 2020, 7 pages.
(Continued)

*Primary Examiner* — Eret C McNichols
*Assistant Examiner* — Michael McDuffie
(74) *Attorney, Agent, or Firm* — Marton Ribera Schumann & Chang LLP; Chien-Ju Alice Chuang; Hector J. Ribera

(57) ABSTRACT

A dashboard attachment device is disclosed for mounting an electronic device within a vehicle. The dashboard attachment device is installed between at least two interior surfaces of a vehicle (e.g., a windshield and a dashboard). The dashboard attachment device may have a wedge shape to fit the intersection between the two interior surfaces. A beam or arm extends away from a base portion of the dashboard attachment device to a mount portion. The mount portion may be used to mount an electronic device that may include one or more sensors directed to the vehicle's environment and/or to position the electronic device in the vehicle
(Continued)

operator's field of view to aid the operator (e.g., with navigation). The mount may be interchangeable subject to the interface to the electronic device. The dashboard attachment device may include an adherence point to secure the dashboard attachment device to one or both of the interior surfaces. The shape of the dashboard attachment device may be tapered to minimize its weight and profile. The dashboard attachment device may include cable routing facilities to route a cable between the electronic device to the vehicle's electrical or computer systems.

21 Claims, 7 Drawing Sheets

(58) Field of Classification Search
USPC .... 248/686, 27.1, 27.3, 200.1, 205.3, 309.3, 248/310, 205.5, 205.7, 206.5, 208, 220.1, 248/309.4, 363; 224/483, 482, 281, 556, 224/545, 275, 548, 555
See application file for complete search history.

(56) References Cited

U.S. PATENT DOCUMENTS

| | | | | |
|---|---|---|---|---|
| 5,779,205 | A * | 7/1998 | Ching | B60R 11/0241 248/205.8 |
| 5,860,573 | A * | 1/1999 | Hossack | B60R 7/06 211/64 |
| 6,036,071 | A * | 3/2000 | Hartmann | B60R 11/00 224/482 |
| 6,170,955 | B1 * | 1/2001 | Campbell | B60R 11/04 248/208 |
| 6,715,210 | B2 * | 4/2004 | Chao | B44D 3/162 30/169 |
| 9,108,575 | B2 * | 8/2015 | Preston | B60R 11/02 |
| 9,132,779 | B2 * | 9/2015 | Azadi | B60R 11/02 |
| D907,870 | S * | 1/2021 | Vasquez | D32/41 |
| 2008/0099521 | A1 * | 5/2008 | Huang | B60R 11/04 224/483 |
| 2009/0230262 | A1 | 9/2009 | Chiu | |
| 2010/0065715 | A1 * | 3/2010 | Fan | B60R 11/00 248/694 |
| 2012/0199621 | A1 | 8/2012 | Yoon | |
| 2012/0205412 | A1 | 8/2012 | Choi | |
| 2013/0313388 | A1 * | 11/2013 | Diatzikis | B60R 11/02 248/205.6 |
| 2014/0048667 | A1 * | 2/2014 | Ziesen | F16M 13/022 248/288.11 |
| 2014/0055617 | A1 * | 2/2014 | Minikey, Jr. | F16F 1/32 348/148 |
| 2014/0176062 | A1 * | 6/2014 | Jung | H02J 50/90 320/108 |
| 2015/0367786 | A1 * | 12/2015 | Chen | B60R 11/02 224/482 |
| 2016/0101742 | A1 * | 4/2016 | Mershon | B60R 11/00 224/482 |
| 2016/0239713 | A1 * | 8/2016 | Stone | B60R 11/04 |
| 2017/0225624 | A1 * | 8/2017 | Fischer | F16M 11/10 |
| 2017/0341598 | A1 * | 11/2017 | Nakai | B60R 1/00 |
| 2018/0050246 | A1 * | 2/2018 | Whittington, III | B65D 81/261 |
| 2018/0056888 | A1 * | 3/2018 | Wang | F16M 13/022 |
| 2018/0134233 | A1 * | 5/2018 | Kim | B60R 11/0241 |
| 2020/0262356 | A1 * | 8/2020 | Mitchell, Jr. | B60R 11/0235 |

FOREIGN PATENT DOCUMENTS

| | | |
|---|---|---|
| DE | 9409337 U1 | 7/1994 |
| DE | 202016005467 U1 | 11/2016 |
| WO | 2014075643 A1 | 5/2014 |

OTHER PUBLICATIONS

International Application No. PCT/US2019/012101, International Search Report and Written Opinion dated Apr. 2, 2019, 6 pages.
Twit Netcast Network, "Owl Dash Cam First Look", YouTube.com, Published on Mar. 3, 2018, https://www.youtube.com/wat?v+QieoDymuhR0, 1 page.
Owl Cameras "Owl Car Cam", Feb. 1, 2018, online retrieved from URL: https://owlcam.com/, 5 pages.
Owl Cameras "Meet Owl, video security for your car", Feb. 1, 2018 online retrieved from URL: https://www.youtube.com/watch?v+oyxSKTZJOHo.

* cited by examiner

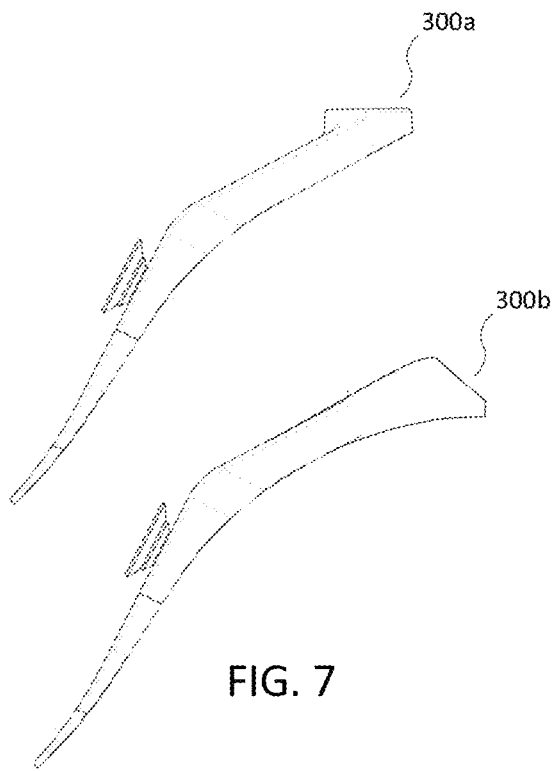
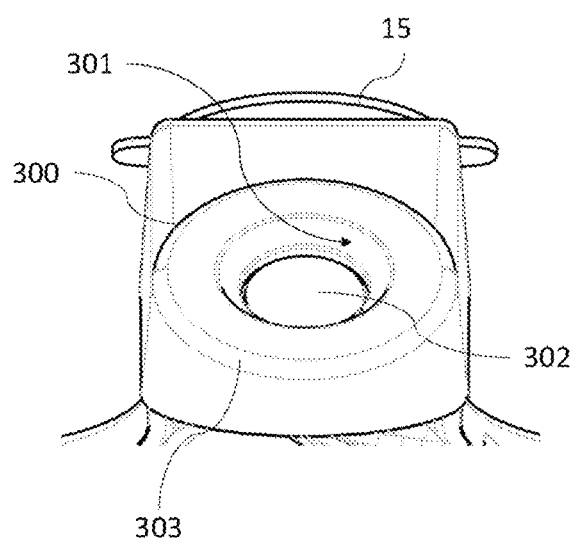
FIG. 7          FIG. 8
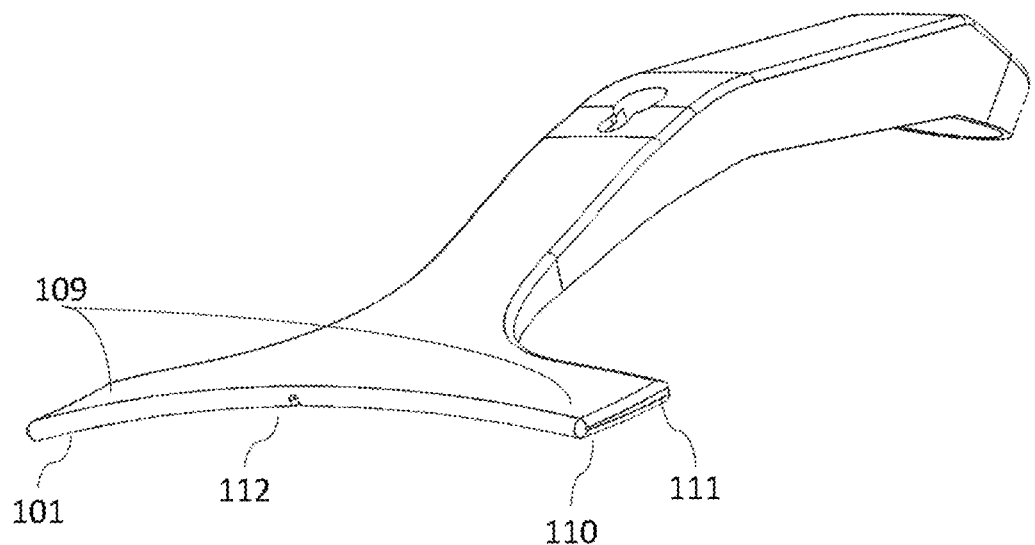
FIG. 9

DASHBOARD ATTACHMENT DEVICE

CROSS-REFERENCE TO RELATED APPLICATIONS

The present application is a national phase entry under 35 U.S.C. § 371 of International Patent Application No. PCT/US19/12101 titled "Dashboard Attachment Device," filed on Jan. 2, 2019, published in English, which claims priority to U.S. Provisional Patent Application No. 62/614,159 filed on Jan. 5, 2018, all of which are incorporated herein by reference in their entirety.

BACKGROUND

This disclosure generally relates to attachment devices for mounting electronic devices on vehicle dashboards or windshields.

Computing and/or navigation devices offer a range of new capabilities to vehicles such as cars, trucks, boats, or planes. These capabilities include navigation, autonomous or semi-autonomous control, collision detection, and/or other vehicle operator aids. While some computing devices are being incorporated into vehicles by the vehicle's manufacturer, other aftermarket devices are available to the consumer as optional add-on devices. These aftermarket devices may be specially designed for use with a vehicle or may be a general-purpose device (e.g., a vehicle operator's smart phone) running special software. These devices may incorporate various sensors to assist the vehicle operator during operation of the vehicle. In some instances, a device may include one or more sensors such as a camera, video camera, or other optical sensor. Such sensors must be positioned so that a portion of the vehicle's environment is within the sensor's field of view. In addition, some governments have enacted laws restricting the handling of electronic devices during operation of a vehicle. Accordingly, devices that aid the operator are preferably visible and accessible but also allow for hands-free operation. Thus, the proper location of such after-market devices is important.

For the average consumer, properly placing and installing such devices can be cumbersome and confusing. It is challenging to install such electronic devices so that they may sense aspects of the vehicle's surroundings while remaining accessible and visible to the vehicle operator without being obtrusive. It is also a challenge to properly route power and other wiring from the vehicle to the dashboard or windshield mounted device, finding the proper connection points, and maintaining the wires out of the way to avoid entanglement and becoming an obstacle to the use or operation of the device.

Thus, what is needed is a dashboard attachment device that allows proper placement of electronic devices in a vehicle, making the device visible to the operator, easily accessible, with unobstructed field of view for proper operation and that can be easily installed by a user.

BRIEF SUMMARY

According to various embodiments of the present invention, a dashboard attachment device is provided. In one embodiment, an electronic device vehicular attachment apparatus includes a base configured to fit in the interface between a first surface, such as for example a windshield, and a second surface adjacent to the first surface, such as for example a dashboard, in a vehicle's interior. The apparatus also includes a mount configured for attachment of an electronic device and a beam that extends from the base towards the mount. The beam is dimensioned to hold the electronic device in a position between the first surface and the second surface inside the vehicle and includes an adherence point that attaches the apparatus to the first surface. According to one embodiment, the base is elongated relative to the beam in a T-shape configuration for securing the attachment apparatus against the first surface.

According to alternative embodiments, the mount includes an interface to attach the electronic device that may be threaded, hinged, magnetic, or socketed.

According to other embodiments, the base has a front face that may be substantially flat or curved towards the beam tangentially to a longitudinal axis of the beam from the base towards the mount, or may taper from a back face towards a front face that is opposite the back face with the height of the front face being less than the height of the back face. The base may also have a bottom face with at least a portion being textured or coated with a tacky material. The base may be formed of a semi-flexible material.

According to another embodiment, the base may have a back face and the beam may have a length and be connected to the base along a portion of the back face with the length of the beam extending away from the back face while the height of the beam (as measured substantially parallel to the back face) steadily increases along the length of the beam to the mount.

According to another embodiment, wherein the base has a front face, the apparatus has a height as measured parallel to the minimum dimension of the front face, the height of the apparatus increases from the front face up to and along the beam.

According to various embodiments, the width of the base may be wider than a width of the beam, which may be removably connected to the mount, may have one or more flanges, or may have a curved portion that curves away from the first surface. According to another aspect of one embodiment, at least one dimension of the beam, for example, its length, may be adjustable, for example, a slideable member of a bottom portion of the beam may slide into an upper portion of the beam. According to another embodiment, the base, the mount, and the beam may be formed of a single piece of material.

According to one embodiment, the beam may have a top side with an adherence mechanism at the adherence point, which, in one embodiment, is located between the base and the mount for securing the apparatus to the first surface, which may be, for example, glass. The adherence mechanism may be a suction cup, a portion of double-sided tape, or a sticky gel, for example. According to yet another embodiment, the base may have an opening for a cable, the beam may include a routing channel for the cable, and the apparatus may include an opening for the cable to reach the electronic device. According to another embodiment, the beam may have an opening for a cable, a routing channel for the cable, and a cavity for holding a ball in the cable. The dashboard attachment device beneficially addresses the shortcomings of the prior art.

According to one aspect of one embodiment, a user may, for example, easily install the dashboard attachment device in a vehicle at the junction of a glass panel and the vehicle's interior trim. For example, in one embodiment, the dashboard attachment device may be positioned at the front of the vehicle between the windshield and the dashboard. According to another aspect of one embodiment, the dashboard attachment device may provide a mount for an electronic device that can aid the vehicle operator and/or include one or more sensors that detect aspects of the vehicle's environment. According to another aspect of one embodiment, the positioning of the dashboard attachment device, for example, at the window/interior trim interface keeps the electronic device accessible and visible to the user while permitting any included sensors to be positioning facing the outside of the vehicle. Additionally, according to another aspect of one embodiment, the profile of the dashboard attachment device is minimized to limit the impact on the vehicle operator's field of view and to avoid obstructions in the device's own field of view. According to yet another aspect of one embodiment, the dashboard attachment device may be removed from the vehicle as needed.

According to one embodiment, the dashboard attachment device optionally includes a movable interface at the electronic device mount to, for example, allow the user to adjust the position of the electronic device. Because many electronic devices may require connection to the vehicle's electrical or computer systems, e.g., a CAN Bus cable, power cable, or the like, in one embodiment the dashboard attachment device includes cable routing facilities to route a cable from the vehicle to the electronic device. Additionally, according to another aspect of one embodiment, the shape and/or flexibility of the base of an attachment device may vary to better secure or stabilize the device and associated electronic device within the vehicle. These and other benefits will be apparent to one of skill in the art based on the following description.

BRIEF DESCRIPTION OF THE SEVERAL VIEWS OF THE DRAWINGS

FIG. 7 depicts two embodiments of a dashboard attachment device with different mounts.

FIG. 8 is a close up of a magnetic attachment mount in a dashboard attachment device according to one embodiment.

FIG. 9 illustrates aspects of the base of an exemplary dashboard attachment device according to one embodiment.

The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

DETAILED DESCRIPTION

The Figures and the following description describe certain embodiments by way of illustration only. One skilled in the art will readily recognize from the following description that other embodiments having varied or alternative structures may be implemented without departing from the principles of the disclosure. Reference will now be made in detail to several embodiments, examples of which are illustrated in the accompanying figures. It is noted that wherever practicable similar or like reference numbers may be used in the figures and may indicate similar or like functionality.

Figure 1:
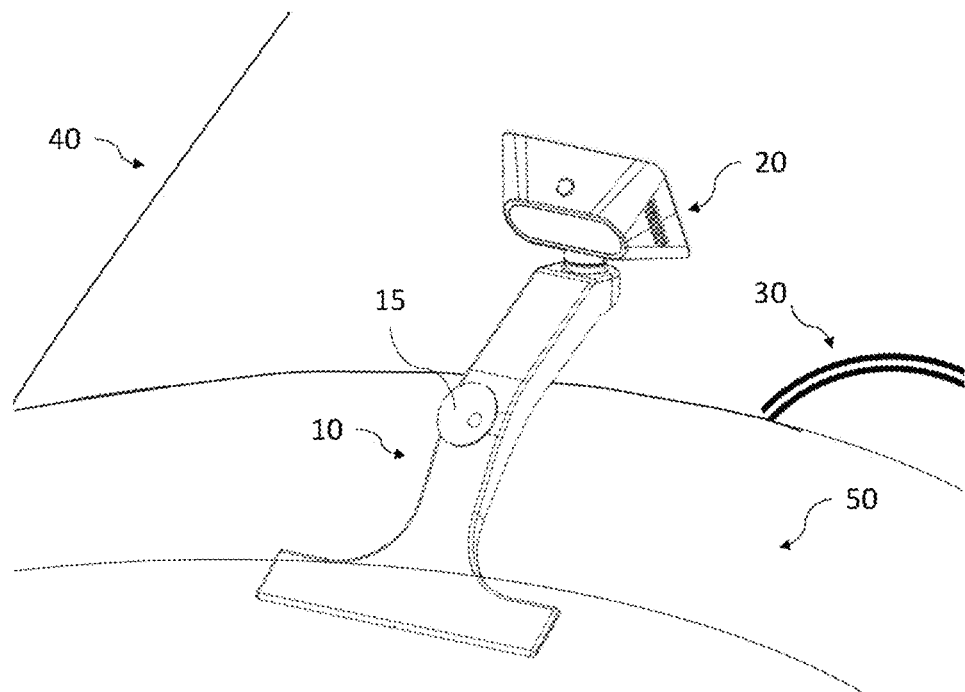
FIG. 1 depicts an exemplary dashboard attachment device with an electronic device according to one embodiment.
Figure 2:
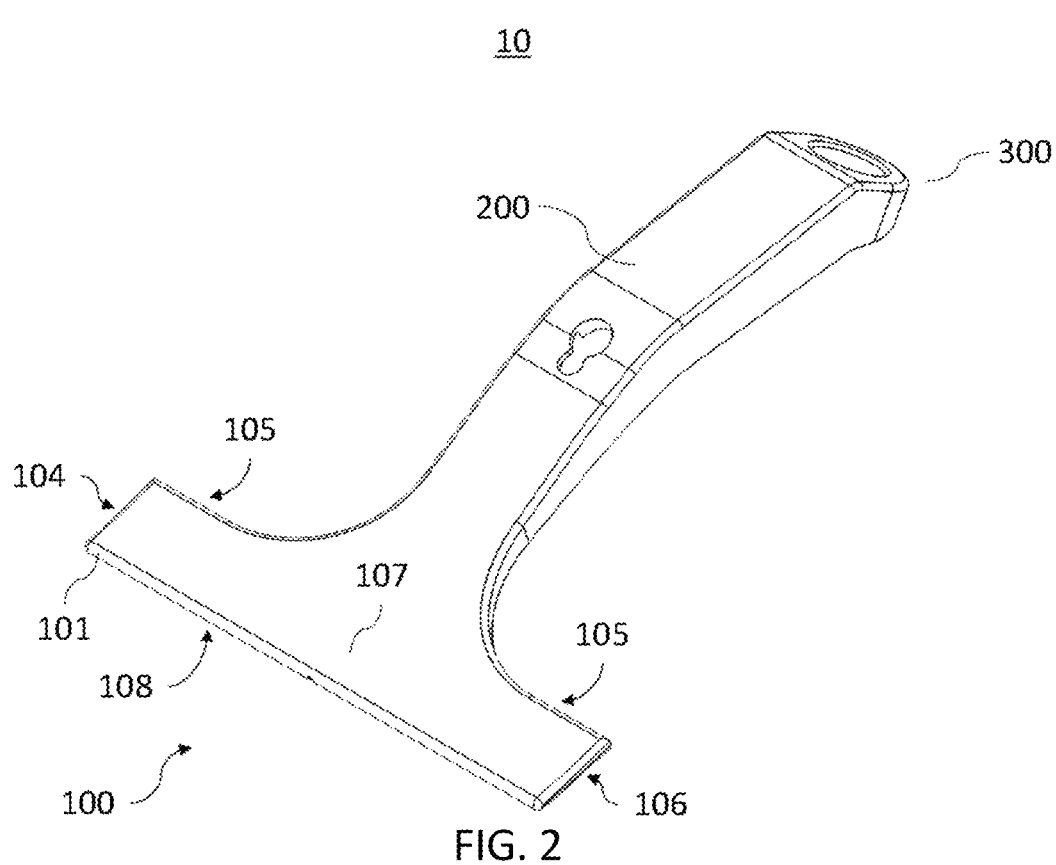
FIG. 2 depicts the dashboard attachment device of FIG. 1.
Figure 3:
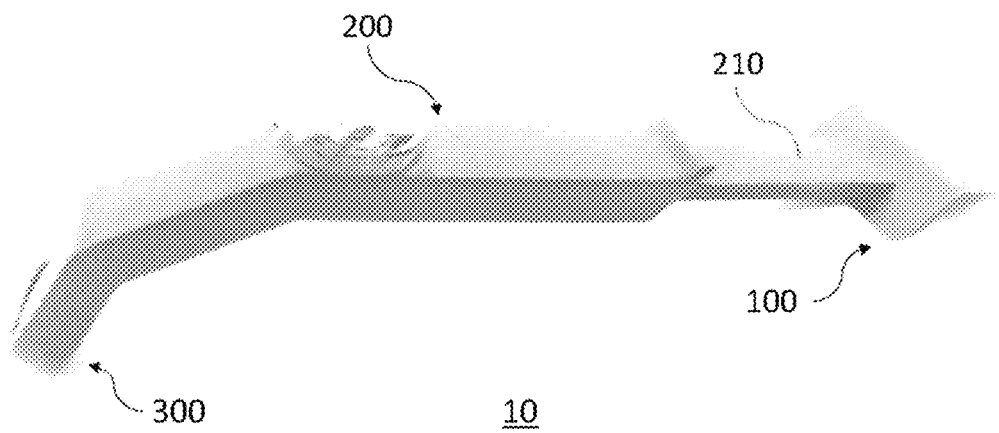
FIG. 3 depicts an exemplary dashboard attachment device with a sliding base according to one embodiment.
Figure 4:
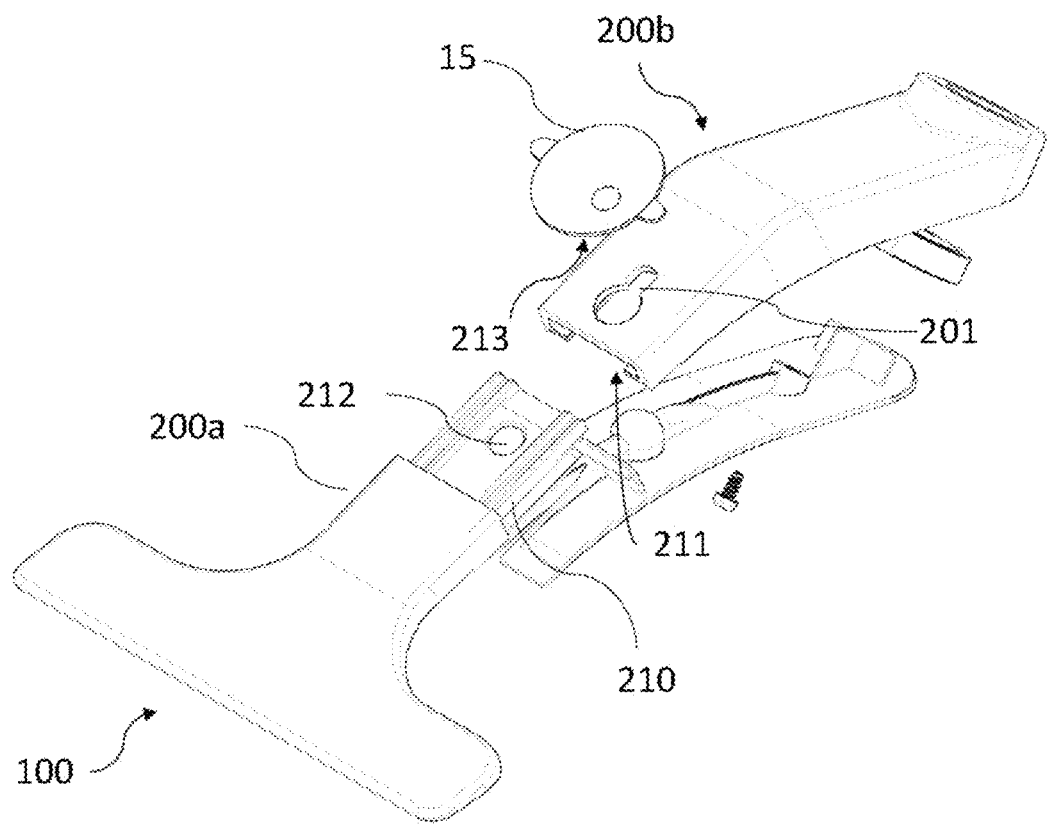
FIG. 4 depicts an exemplary dashboard attachment device with replaceable, differently sized, bottom arm portions according to one embodiment.

FIG. 1 depicts an exemplary dashboard attachment device with an electronic device according to one embodiment. In this embodiment, the dashboard attachment device 10 may be used to position an electronic device 20, such as, for example, a smartphone, a camera device, a sensor device, a navigation system, or the like, at the interface between a vehicle's interior trim 50 and a window panel 40. For example, the dashboard attachment device may reside at the interface between the front windshield 40 and the dashboard 50 of a vehicle, such as a car, a truck, a boat, or a plane, facing the steering device 30 (e.g., steering wheel, yoke, or the like) and thus the operator of the vehicle. At the same time, the electronic device may also be located so as to provide it with a clear and unobstructed field of view of the area in front of the vehicle (in the direction of travel) and possibly of the cabin or interior of the vehicle. For example, for installation of a dashboard camera device 20 with a front-facing camera and a rear-facing camera. To install the dashboard attachment device 10, a user may slide a base portion along the trim 50 until it reaches the vehicle window 40 and slide up until adherence point 15 attaches to the window 40. While in this and other embodiments the dashboard attachment device is generally described as being located between the dashboard and windshield of a vehicle, a dashboard attachment device may be configured for use in the rear (e.g., behind the seats of a vehicle between the rear window and interior trim) or in another location within the vehicle. FIG. 2 depicts a dashboard attachment device without an electronic device according to one embodiment. By way of example, the illustrated dashboard attachment device 10 can be generally divided into three principal structures: a base portion 100 (sometimes referred to as an anchor), a beam portion 200 (sometimes referred to as an arm), and a mount portion 300. The beam 200 connects the mount 300 to the base 100, generally in a T-shape configuration. The length of the beam may vary across embodiments depending on the vehicle configuration. In one embodiment, the beam 200 is extendable, for example by sliding in and out in one or more joints. For example, FIG. 3 shows one embodiment of attachment device 10 with a base 100 that includes a sliding component 210 to slide in and out of arm 200 for adjustment of size. In an alternative embodiment, as for example illustrated in FIG. 4, the base 100 of attachment device 10 is integrally formed with a bottom portion of the arm 200a. The length of the bottom portion of the arm 200a can vary to provide different sizes of the attachment device 10. For example, in one embodiment, three different base/bottom arm configurations are provided, one with a half-inch bottom arm portion 200a, one with a two-inch bottom arm portion 200a, and one with a four-inch bottom arm portion 200a. FIG. 4 provides a bottom arm portion 200a of approximately 2 inches by way of example. The different size base-bottom arm portion include a sliding member 210 that slides into a grove member 211 in the upper portion of the arm 200b. In one embodiment, sliding member 210 includes an indentation 212 to receive the bottom part 213 of window adherence point 15. The bottom part 213 of window adherence point 15 enters through opening 201 in the top arm portion 200b and locks into place by sliding into the narrower end of opening 201. When secured in place, the bottom part 213 of window adherence point 15 applies pressure between the inner surface of upper arm portion 200b and bottom arm portion 200a at the indentation 212, thereby securing both portion of arm 200 together. For example, in one embodiment, a user may select the proper size bottom arm 200b for a given vehicle and slide it into upper arm 200b and secure it with window adherence point 15 for a resulting properly sized integral attachment device 10.

In one embodiment, the beam 200 can be made substantially the same length as the depth of the dashboard's top surface 50, for example, with a sliding arm, an insertable properly sized base-bottom arm portion, or the like. According to one aspect of one embodiment, extending the mount 300 away from the base 100 with a suitable length beam 200 provides clearance for the electronic device 20 between the mount 300 and the windshield. In addition, according to another aspect of one embodiment, the length of the beam 300 is adjusted to make the electronic device 20 more accessible to a vehicle operator. In another embodiment, the length of the beam 200 is such that it positions the device 20 such that any included camera or other imaging sensors have a field of view of a portion of the vehicle's environment relevant to the camera or sensor purpose.

Figure 13:
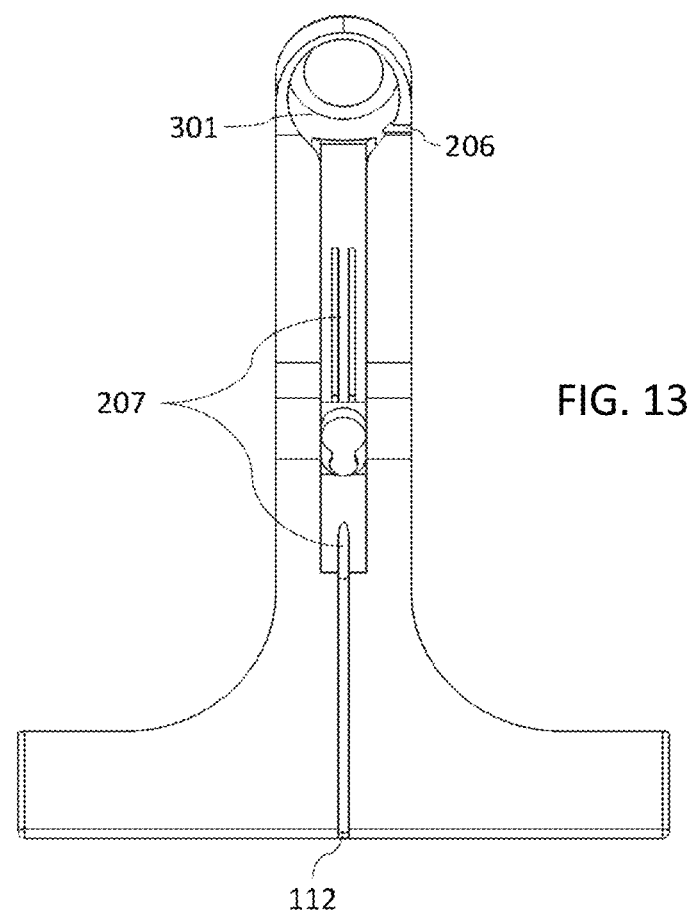
FIG. 13 depicts a bottom view of an exemplary dashboard attachment device with cable management features according to one embodiment.

As shown in FIGS. 1 and 2, mount portion 300 of the dashboard attachment device 10 may be used to attach the electronic device 20 according to one embodiment. Mount 300 includes an interface to secure the electronic device 20 to the dashboard attachment device 10. Any suitable interface for mounting a device may be employed, including mechanical connectors, clips, screws, magnetic holds, or the like. Further, the interface may be a standard interface, such as a ¼ inch screw tripod mount, or a custom interface. In any case, the mount 300 interface is adapted to mate with a complementary interface on to the electronic device 20 (e.g., a ¼ inch threaded hole, a magnetic metal, a male clip attachment, or the like). In one embodiment, the interface allows some degree of movement of the device 20 with respect to the mount 300, by for example, being rotationally movable, hinged, or the like, so that the user may adjust the positioning of the electronic device 20 after installation in the vehicle. In an exemplary embodiment, the mount 300 has a magnetic ball and socket interface to electronic device 20. As shown in FIG. 13, the mount 300 may include a hollow 301 for installation of any suitable interface hardware, such as for example a magnetic attachment device. One or more covers (as for example shown in FIG. 14) may be placed over and/or below hollow 301 once the interface hardware is installed. FIG. 7 shows different embodiments of mount 300. Mount 300a includes an elevated portion that extends up and away from the arm while mount 300b is flush with the arm and includes a diagonal surface for mounting electronic device 20, for example with an enclosed magnetic connector.

FIG. 8 shows an illustrative embodiment of a magnetic socket connector for mount 300. The magnetic socket includes a magnetic ring 301, such as a N42/N45 magnet. The magnetic ring 301 may for example have a 0.5-inch inner diameter and a 1.0-inch outer diameter. A metal button 302 resides inside the ring and, in one embodiment, includes a concave top surface for receiving a ball attachment from the electronic device 20. In one embodiment, the inner top edge of the magnetic ring is chamfered to provide a continuous concave surface, continuing the contour of the inner metallic button 302. In one embodiment, the magnetic ring may be covered by a top plastic surface 303, for example made of 20-30% glass-filled nylon, providing a softer surface for the ball attachment on the electronic device to minimize wear and tear but still being rough enough to not be slippery.

Figure 11:
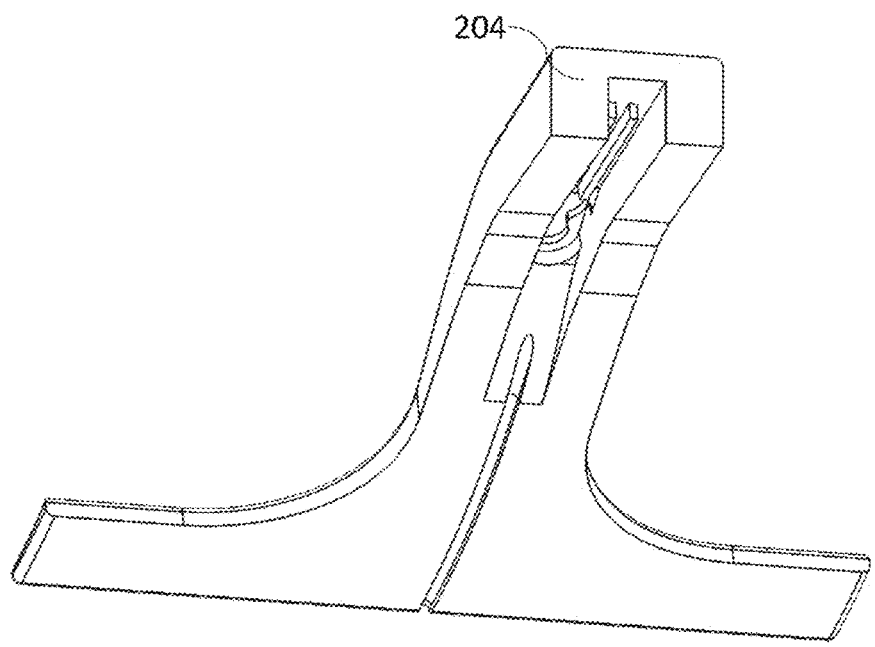
FIG. 11 depicts another view of the beam and base of an exemplary dashboard attachment device according to one embodiment.

In some embodiments, the mount may be removably connected to the beam 200. For example, FIG. 11 shows an attachment device 10 with the mount 300 removed. In such embodiments, the user may select between several mounts to connect to the beam, each mount having a different interface appropriate for a particular kind of electronic device.

Referring back to FIGS. 1 and 2, the depicted mount 300 is configured to accept electronic device 20 on the top of the dashboard attachment device 10. In some embodiments, the mount 300 may be configured to suspend the electronic device from above or to grasp the electronic device on either the left or right side of the mount. The positioning may vary depending on the field of view requirements of any sensors included with the electronic device and/or the user's preference. According to one embodiment, the mount 300 is rotatably attached to beam 200 so as to allow a user to rotate the mount 360 degrees around the axis of the beam 200 to enable the placement of the device 20 in any suitable location with respect to the beam 200, such as above, below, or to either side.

Figure 5:
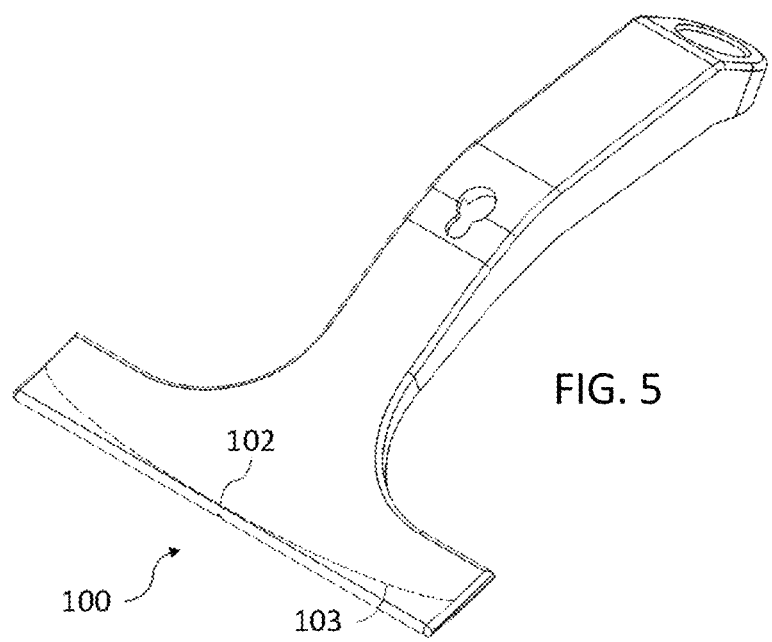
FIG. 5 depicts another exemplary dashboard attachment device illustrating alternative base shapes according to one embodiment.
Figure 6:
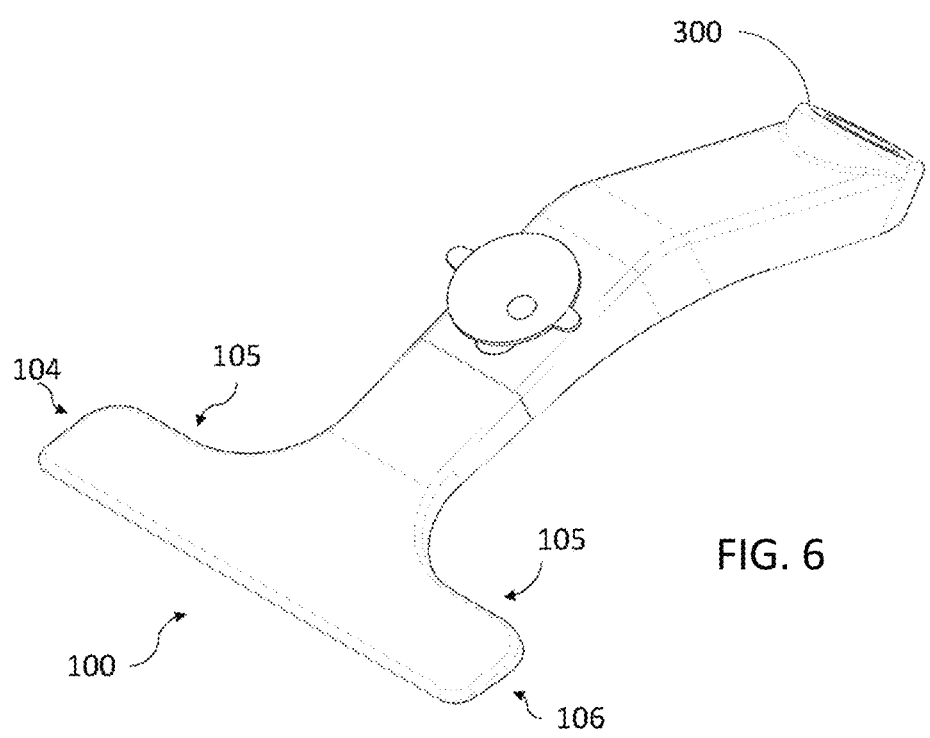
FIG. 6 depicts another exemplary dashboard attachment device with alternative base shapes according to one embodiment.

Referring back to FIG. 2, in one embodiment, base 100 has a generally rectangular shape and is in a T-shape configuration relative to the beam and mount. Front face 101 is opposite rear face 105, top face 107 is opposite bottom face 108, and left face 104 is opposite right face 106. In one embodiment, base portion 100 is shaped to fit between the interior surface of a glass panel in vehicle (e.g., a windshield) and the adjacent interior trim (e.g., a dashboard). As shown in FIG. 2, front face 101 may have a straight top and bottom edge. Alternatively, some embodiments of the dashboard attachment device like the one depicted in FIG. 5 may have a front face having ends that curve away or otherwise recede from base midpoint 102 as shown by dashed line 103. In an alternative embodiment, as for example shown in FIG. 3, the front face of base 100 may be shorter than for example the embodiment shown in FIG. 5. The transition from rear face 105 to left face 104 and right face 106 may be a right angle as shown in FIG. 2, may be rounded as shown in FIG. 6, or have other angled or multi-side profile. As one of ordinary skill in the art will appreciate, alternative configurations of base 100 are possible within the scope of this disclosure, such as for example, a base shaped in an expandable ripple configuration, concave or convex shaped configurations, or the like.

FIG. 9 illustrates other aspects of the base portion 100 of the dashboard attachment device 10 according to one embodiment. Ends 109 of base 100 may bend to conform to a curvature at the interface between a vehicle's glass panel and interior trim. In this embodiment, the base curves from its midpoint 102 to its ends 109 tangentially to the longitudinal axis of beam 200, in a generally convex shape. Such a lateral bend in base 100 may increase the number of contact points or the surface area of contact between the base 100 and the vehicle, may stiffen the beam 200, and/or may bring the adherence point 15 in closer proximity to the vehicle's glass panel. The curvature of the bend of base portion 100 according to this embodiment may be decreased when base is wedged into position between the glass panel and vehicle trim, to allow the base to slide in the opening defined by the two surfaces while applying force relative to the elastic coefficient of the material used on one surface from the two ends 109 and on the other surface along the midpoint 102. In an alternative embodiment, the curvature of base 100 is in the opposite direction, providing a generally concave shape. To permit this bending, the base 100 may be constructed of a semi-flexible or semi-rigid material, such as, 20%-30% glass-filled nylon material. However, other materials may be used.

According to another aspect of this embodiment, the profile or cross-section of base 100 may taper from the rear face 105 to the front face 101. That is, the height of right face 106 increases the further away from the front face 101 (from point 110 to point 111). Similarly, the height of the left face 104 and cross-section between the left face 104 and right face 106 would increase in the distal direction. This wedge-shaped profile or cross-section may increase the amount of contact between the base 100 and the vehicle's surfaces and may create an interference at the interface of the glass panel and vehicle trim to limit insertion of the dashboard attachment device into the window-trim interface.

According to another aspect of this embodiment, the front face 101 of base 100 may be rounded (as shown) to better secure dashboard attachment device in a vehicle and to ease installation. Additionally, the front face 101 may include an opening 112 for routing a cable from the vehicle to the electronic device, as described in further detail below. Alternatively, the base 100 may include an opening on one or both of left side 104 and right side 106, with a cable routing channel or groove extending from the side(s) up along the length of the beam and optionally through mount 200.

Figure 10:
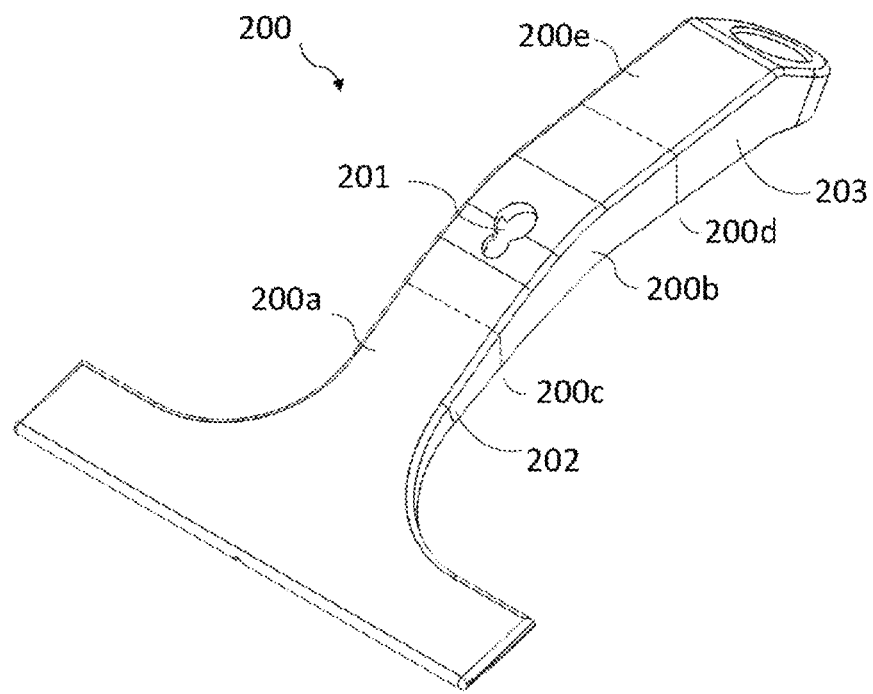
FIG. 10 illustrates aspects of a beam of an exemplary dashboard attachment device according to one embodiment.

FIG. 10 illustrates aspects of the beam portion 200 of the dashboard attachment device 10 according to one embodiment. The beam portion 200 may be narrower in width along its length than the base portion 100. This reduces the overall profile of the dashboard attachment device as seen through the window or as seen from the field of view of an operator of the vehicle. Beam portion 200 may be centered relative to the base portion 100, or offset to one side or the other of the midpoint of the base portion.

In some embodiments, the beam 200 may taper from the distal end 203 toward the proximal end 202. Such a tapered beam profile (increasing in height toward the mount 300), in addition to providing a better visual aesthetic of the dashboard attachment device 10, serves to further limit any obstruction to the operator's field of view through the vehicle's window and to reduce the mass and amount of material used in the dashboard attachment device. Tapering of beam 200 may seamlessly transition into the tapering of the base 100 as further described above. According to another aspect of one embodiment, beam 200 of dashboard attachment device 10 may optionally include one or more adherence points 15 to adhere, fasten, or otherwise secure the beam portion 200 to the vehicle's glass panel. As shown in FIG. 10, the adherence point 15 may attach to or otherwise be provided at a location 201 on the top surface of beam 200 according to one embodiment. Adherence point 15 may include a suction cup as an adherence mechanism, as illustrated in FIG. 1. The suction cup may include a locking feature as discussed above with reference to FIG. 4. The adherence mechanism serves to mechanically secure the adherence point to the window. Alternative adherence mechanisms may include, for example, loop-and-hook pads or tape (e.g., Velcro™ pads or tape), double-sided sticky tape, sticky gel, glue, or the like. As one of ordinary skill in the art would understand, any other adherence mechanism suitable to adhere the attachment device to a glass panel or other surface in a vehicle may be used. In addition to positioning the dashboard attachment device within the vehicle, the adherence point 15 serves to secure the dashboard attachment device from dislodging from the window-interior interface in the event of a sudden acceleration. Adherence points may additionally limit the lateral displacement of beam 200 (and overall attachment device) with lateral forces applied in a vehicle, e.g., when turning. Note that in some embodiments, the adherence point may fasten the dashboard attachment device to the lower surface of the vehicle (e.g., the dashboard).

As noted above, in some embodiments, beam 200 may be extendable. Bottom beam portion 200a may be coupled to upper beam portion 200b via joint 200c as described with reference to FIG. 4. Likewise, beam portion 200b may be coupled to beam portion 200e via joint 200d. Beam portions 200a and 200b may slide closer together or farther apart at joint 200c. Beam portions 200b and 200e may slide closer together or farther apart at joint 200d. By including one or more slidable joints within beam, the fit of the dashboard attachment device within the vehicle may be further adjusted based on factors such as dashboard depth and the angle between the dashboard and the windshield. In one embodiment, one or more slidable joints may include locks, such as screws, push-pins, or the like, to lock the slidable beam portions in place at the desired length. FIG. 11 depicts another view of the beam portion 200 of the dashboard attachment device 10. In this view, the mount 300 has been cutaway to show an exemplary cross section of beam 200. In some embodiments, beam 200 has a U-beam cross-section 204. The U-beam cross-section has one or more flanges to limit the amount of linear deflection caused by the electronic device attached to the mount 300 or due to movement of the vehicle. In addition, the u-beam cross-section provides structural rigidity while reducing the amount of material needed to manufacture the attachment device.

Figure 12A:
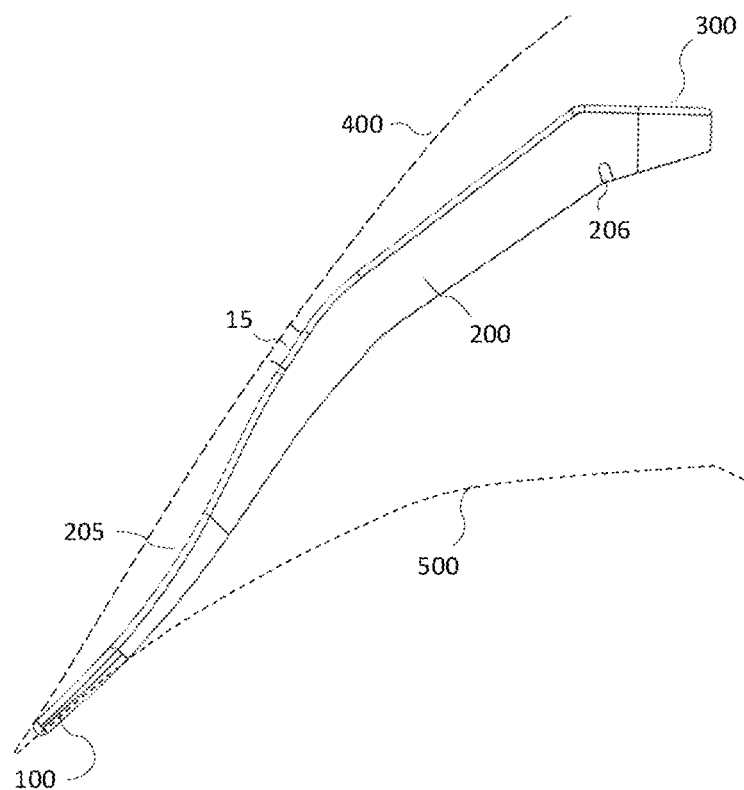
FIG. 12A depicts a side view of an installed exemplary dashboard attachment device according to one embodiment.
Figure 12B:
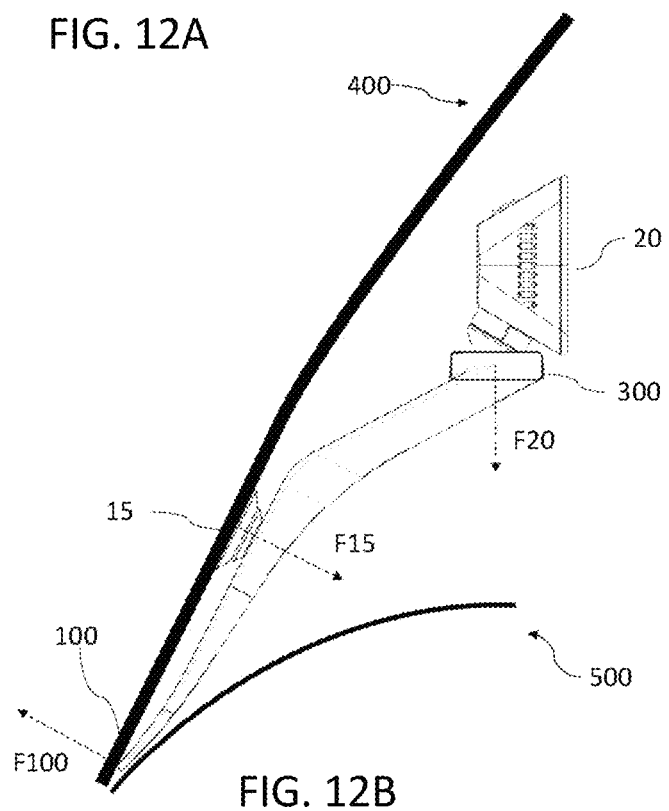
FIG. 12B depicts a side view of an installed exemplary dashboard attachment device according to another embodiment.

FIG. 12A depicts a side view of an exemplary dashboard attachment device 10 according to one embodiment. As shown, dashboard attachment device 10 (comprising base portion 100, beam portion 200, and mount portion 300) is installed between a vehicle's windshield 400 and dashboard 500. As depicted in FIG. 12A, the dashboard attachment device increases in height from the proximal end of the base portion 100 to the distal end of the beam portion 200. As mentioned above, this continuous taper reduces the mass and material in the dashboard attachment device and provides a reduced visual profile. Also shown in the embodiment depicted in FIG. 12A is a downward curvature of the dashboard attachment device between the proximal end of the base portion 100 and the adherence point 15. A downward curvature along some portion of the span between the base portion 100 and the adherence point 15 may be used to limit the contact of the dashboard attachment device against windshield 400, thereby creating discrete contact points with the windshield near the base portion 100 and at adherence point 15. FIG. 12A shows a very-high bond (VHB) adherence mechanism, but in other embodiments, one or more adherence points 15 may be provided with different types of adherence mechanisms. The adherence mechanisms may be provided with different shapes. In one embodiment, a suction cup is provided that attaches to beam 200 through opening 201 and that locks into the narrower side of opening 201 (as for example shown in FIG. 4) with a square "neck" connecting its bottom part 213 to the suction cup. The square neck, instead of the traditional cylindrical one, provides additional surface in contact with the sides of the opening 201, which limits the rotation of beam 200 around adherence point 15. In one embodiment, the dashboard attachment device may be rotated around the base 100 (e.g. pushed up) to bring whatever adherence mechanism is present at the adherence point or points in contact with the windshield 400. As illustrated in FIG. 12B, the adherence point 15 acts as a fulcrum for the dashboard attachment device when an electronic device 20 is installed at mount portion 300. In the view shown in FIG. 12B, the weight of the electronic device (represented by downward pointing arrow F20) may create a clockwise torque about the adherence point 15. This torque may improve the adhesion between the dashboard attachment device and the windshield by orienting the force against the adherence mechanism in a normal direction (as illustrated by arrow F15). For example, when a suction cup is used as illustrated in FIG. 12B, the loading of the electronic device may cause the dashboard attachment device to pull on the suction cup in a direction normal to the windshield's surface for optimum performance of the suction cup. The base 100 provides a contact or pivot point applying force (illustrated by arrow F100) against windshield 400 in the opposite direction.

Figure 14:
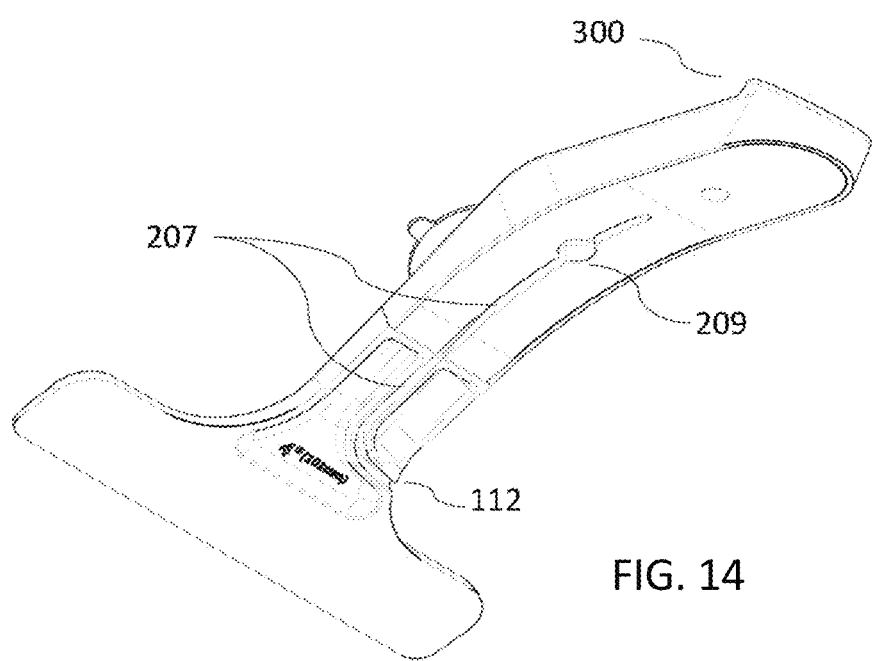
FIG. 14 depicts a bottom view of an exemplary dashboard attachment device with cable management features according to another embodiment.

FIG. 13 depicts a bottom view of the dashboard attachment device 10 according to one embodiment. As shown, in this embodiment, the underside of dashboard attachment device 10 includes channels 207 to route one or more cables from the cable entry point 206 to the cable exit point 112. Note that cable exit point may exist on the left side, right side, top side, and/or bottom side of dashboard attachment device 10 on either the beam portion 200 or the mount portion 300. For example, FIG. 14 shows the cable exit point 112 on the side of the attachment device opposite to the side closest to the vehicle operator. In one embodiment, the entry point 106 routes the one or more cables through the mount portion 300.

FIG. 14 depicts a bottom view of a dashboard attachment device 10 according to another embodiment. As shown, in this embodiment, the underside of the dashboard attachment device 10 also includes a channel 207 to route at least one cable from the device 20 (not shown) to the exit point 112. In this embodiment, the underside of the dashboard attachment device also includes a cavity 209 close to the end of channel 207 in the side closets to mount 300. In this embodiment, the cable that connects to device 20 includes a corresponding ball placed at a location on the cable that is away from the device connector sufficient for the cable to reach the device 20 without much slack. For example, after connecting the cable to device 20, a user would simply push the cable ball into cavity 209 continuing to route the cable through channel 207 to exit point 112. Once the attachment device is properly installed (with the cable being connected to the proper connector in the vehicle, typically from the driver side of the dash) any extra length of cable can be folded into the space between the windshield and the dashboard extending towards the front passenger side and then looping back towards the attachment device and entering on the side away from the driver through point 112. This provides a convenient was to tuck away any extra length of the cable, and conceal it from view.

Channels 207 simplify cable routing and management when installing an electronic device 20 into a vehicle using the dashboard attachment device 10. Additionally, the cable channels 207 may partially or completely conceal the cable from view. Channels may be formed as part of the dashboard attachment device, or may be a separate insert installed into a larger cavity of the dashboard attachment device.

According to another aspect of the disclosure, dashboard attachment device 10 may be constructed using a variety of materials and techniques. For example, the frame of the dashboard attachment device (including the base 100, beam 200, and mount 300) may be a single structure formed via injection molding, or the like. Alternatively, one or more portions of the dashboard attachment device may be separately formed and later joined with glue, solder, or the like. Different materials may be used for each of the portions of the device or all the portions may be manufactured of the same material, including, for example, aluminum, steel, plastics, or the like. In one embodiment, the base, beam, and mount portions are made of 20% glass-filled nylon. According to one embodiment, edges and/or faces of the different portions of dashboard attachment device may be beveled or rounded to ease handling and installation. Portions or the entirety of base portion 100 may be coated or formed with a tacky material to increase the amount of friction between the base and the adjacent vehicle surface(s), or may be textured to roughen the base's surface for a similar effect.

The foregoing description of the embodiments has been presented for illustration only; it is not intended to be exhaustive or to limit the patent rights to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. An electronic device vehicular attachment apparatus comprising:
   a base configured to fit in an interface between a first surface and a second surface adjacent to the first surface in a vehicle's interior, the base having at least two faces including a first face configured to be at least in partial contact with the first surface and a second face configured to be at least in partial contact with the second surface;
   a mount, the mount configured for attachment of an electronic device; and
   a beam extending from the base to the mount and is dimensioned to hold the electronic device in a position between the first surface and the second surface in the vehicle, the beam including an adherence point attaching the apparatus to the first surface,
   wherein the base is elongated relative to the beam in a T-shape configuration for securing the attachment apparatus against the first surface.

2. The apparatus of claim 1, wherein the first surface is a windshield and the second surface is a dashboard.

3. The apparatus of claim 1, wherein the mount further includes an interface to attach the electronic device, wherein the interface is threaded, hinged, magnetic, or socketed.

4. The apparatus of claim 1, wherein the base has a front face that is substantially flat.

5. The apparatus of claim 1, wherein the base has a front face that is curved towards the beam tangentially to a longitudinal axis of the beam from the base towards the mount.

6. The apparatus of claim 1, wherein the base is formed of a semi-flexible material.

7. The apparatus of claim 1, wherein the first face or the second face comprises a bottom face, at least a portion of the bottom face being textured or coated with a tacky material.

8. The apparatus of claim 1 wherein the base tapers from a back face towards a front face that is opposite the back face, a height of the front face being less than a height of the back face.

9. The apparatus of claim 1 wherein the base has a back face and the beam has a length, the beam connected to the base along a portion of the back face, the length of the beam extending away from the back face, the height of the beam as measured substantially parallel to the back face steadily increasing along the length of the beam to the mount.

10. The apparatus of claim 1, wherein the base has a front face, the apparatus has a height as measured parallel to the minimum dimension of the front face, the height of the apparatus increases from the front face up to and along the beam.

11. The apparatus of claim 1, wherein a width of the base is wider than a width of the beam.

12. The apparatus of claim 1, wherein the beam is removably connected to the mount.

13. The apparatus of claim 1, wherein the beam has a curved portion that curves away from the first surface.

14. The apparatus of claim 1, wherein the beam has a top side and a bottom side, the top side having an adherence mechanism at the adherence point located between the base and the mount for securing the apparatus to the first surface.

15. The apparatus of claim 14, wherein the first surface is glass.

16. The apparatus of claim 14, wherein the adherence mechanism is a suction cup, a portion of double-sided tape, or a sticky gel.

17. The apparatus of claim 1, wherein a dimension of the beam is adjustable.

18. The apparatus of claim 1, wherein the base is formed with at least a bottom portion of the beam, the bottom portion of the beam including a slideable member that slides into an upper portion of the beam.

19. The apparatus of claim 1, wherein the base, the mount, and the beam are formed of a single piece of material.

20. The apparatus of claim 1, wherein the base has an opening for a cable, the beam has a routing channel for the cable, and the apparatus further includes an opening for the cable to reach the electronic device.

21. The apparatus of claim 1, wherein the beam has an opening for a cable, a routing channel for the cable, and a cavity for holding a ball in the cable.

* * * * *